United States Patent [19]

Mücke et al.

[11] Patent Number: 4,463,119

[45] Date of Patent: Jul. 31, 1984

[54] MOLDING COMPOSITIONS WHICH ARE BASED ON VINYL CHLORIDE POLYMERS AND SHOW INCREASED WHITE FRACTURE EFFECT

[75] Inventors: Rainer Mücke, Burgkirchen; Johann Schiller, Neuötting, both of Fed. Rep. of Germany

[73] Assignee: Hoechst Aktiengesellschaft, Frankfurt am Main, Fed. Rep. of Germany

[21] Appl. No.: 375,820

[22] Filed: May 7, 1982

Related U.S. Application Data

[63] Continuation of Ser. No. 275,941, Jun. 22, 1981, abandoned.

[30] Foreign Application Priority Data

Jul. 1, 1980 [DE] Fed. Rep. of Germany ....... 3024811

[51] Int. Cl.$^3$ ...................... C08L 27/06; B29C 17/00
[52] U.S. Cl. .................................. 524/269; 524/506; 524/523; 524/527; 525/101; 525/104; 264/293; 264/320
[58] Field of Search ............... 524/269, 506, 523, 527; 525/101, 104; 264/293, 320

[56] References Cited

U.S. PATENT DOCUMENTS

| | | | |
|---|---|---|---|
| 3,428,707 | 2/1969 | Amos et al. | 525/104 |
| 3,697,349 | 10/1972 | Andraschek et al. | 156/219 |
| 4,082,711 | 4/1978 | Andrascheck et al. | 524/523 |
| 4,289,859 | 9/1981 | Kalinowski et al. | 525/104 |

FOREIGN PATENT DOCUMENTS 56-26939  3/1981  Japan .................................. 525/104

Primary Examiner—Wilbert J. Briggs, Sr.
Attorney, Agent, or Firm—Connolly and Hutz

[57] ABSTRACT

Molding compositions which are based on vinyl chloride polymers and give shaped articles, for example sheeting, with a pronounced white fracture effect which occurs in clear contours are described. The molding compositions essentially consist of vinyl chloride polymers as the main component and a relatively small amount of solid and/or liquid polyorganosiloxanes.

6 Claims, No Drawings

MOLDING COMPOSITIONS WHICH ARE BASED ON VINYL CHLORIDE POLYMERS AND SHOW INCREASED WHITE FRACTURE EFFECT

CROSS REFERENCE TO RELATED APPLICATION

This application is a continuation of application Ser. No. 275,941 filed June 22, 1981 and now abandoned.

The invention relates to molding compositions which are based on vinyl chloride polymers and which show an increased white fracture effect. The invention particularly relates to those molding compositions which are based on vinyl chloride polymers, can be processed easily and without difficulty and give shaped articles with outstanding white fracture characteristics.

It is known that shaped articles, for example sheeting, obtained from molding compositions consisting essentially of vinyl chloride polymers as the main constituent and elastomers, such as, for example, acrylonitrile/butadiene/styrene (ABS) resins, methyl methacrylate/butadiene/styrene (MBS) resins or methyl methacrylate/acrylonitrile/butadiene/styrene (MABS) resins, in an amount of up to about 20% by weight, relative to the total mixture, have white fracture characteristics (compare the journal "Plaste und Kautschuk", 1972, Volume 4, pages 255 to 259). The cause of the white fracture of such sheeting, in which the elastomer component is present as the disperse phase (elastic phase) in the vinyl chloride polymer (hard phase) and the diameter of the elastomer particles is at least 0.01 μm, has not yet been completely clarified. It is generally assumed that white fracture is caused by the formation of defects (microfissures, crazes) in the sheeting as a result of deformation (elongation) of the sheeting beyond the stretching limit (such deformations occur, for example, when letters are applied by embossing) and by a change in the double refraction of light in the defects (compare the journal quoted, page 256, right-hand column in connection with page 258, left-hand column).

However, the contrast which arises from the white fracture and which sheeting of the abovementioned molding compositions of vinyl chloride polymers and elastomers display inherently after deformation is not sufficient if this sheeting is to be employed, for example, for the application of letters by embossing. In fact, a far more intense and, in particular, more contrasting white fracture is required in this case.

It is known from American Patent Specification No. 2,925,625 that molding compositions of vinyl chloride polymers, stabilizers, lubricants, dyestuffs and an inorganic additive or a plasticizer which is incompatible with vinyl chloride polymers (extender/plasticizer) can be processed to shaped articles, for example they can be calendered or extruded to sheeting, which has white fracture characteristics (white fracture sheeting). This sheeting can thus be embossed in a contrasting white color shade by cold shaping, an example being the lettering obtained by means of the commerically available embossing apparatus "Dymo Mite" Tapewriter ® model 2 from Messrs. Dymo Industries Inc., Berkeley, Calif., USA. A disadvantage is, however, that the inorganic additives or incompatible plasticizers necessary for producing the white fracture cloud the sheeting, which reduces the contrast of the white fracture. In addition, these molding compositions are difficult to process and the resulting sheeting is not particularly flexible.

German Patent Specification No. 1,804,049 describes special emulsion graft polymers of vinyl chloride and a copolymer of butadiene, styrene and acrylates or methacrylates for the production of sheeting with a white fracture effect. However, the white fracture which this sheeting receives by embossing likewise does not completely fulfil the requirements made in respect of a good contrast.

Finally, it is known, from German Patent Specification No. 2,547,612, that molding compositions consisting of (a) a vinyl chloride polymer as the main constituent, (b) an elastomer of the group comprising ABS, MBS and/or MABS polymers, in an amount of 5 to 25% by weight, relative to the total mixture, (c) a plasticizer which is compatible with the vinyl chloride polymer, in an amount of 3 to 10% by weight, relative to the total mixture, and (d) customary stabilizers, lubricants and other appropriate additives, can be used for the production of shaped articles, in particular sheeting, for embossing utilizing the white fracture effect. This sheeting has the disadvantage that, in particular, the temperature stability of the white fracture leaves something to be desired.

The object of the invention is thus to provide molding compositions which are based on vinyl chloride polymers and with which shaped articles, in particular sheeting, which show a particularly markedly contrasting white fracture which occurs in clear contours and is also stable even at relatively high temperatures are obtained. The molding compositions should moreover be readily processable by the calender method or extruder method without difficulties, and should give shaped articles which also have those physical properties, such as rigidity, elasticity, tensile strength, toughness and as little clouding of the material as possible (clarity), which are desirable for white fracture sheeting (which is employed, in particular, for the production of labels, signs and packaging materials).

According to the invention, this object is achieved by molding compositions which are based on vinyl chloride polymers and have an increased white fracture effect consisting essentially of: (A) at least one vinyl chloride polymer as the main constituent, and (B) at least one solid polyorganosiloxane which has a melting point of not greater than 200° C., and/or at least one liquid polyorganosiloxane which has a volatility, given as weight loss, of not more than 2.5% by weight after being heated at 230° C. under normal pressure for 15 minutes, the amount of component (B) being 0.05 to 1.5% by weight, relative to the total weight of the molding composition.

According to the invention, solid and/or liquid polyorganosiloxanes are thus employed in order to achieve white fracture in vinyl chloride polymers. The chemical structure of these polyorganosiloxanes can vary within wide limits, and is in itself not critical. For the proposal according to the invention to be successful it is only important that the solid polyorganosiloxanes melt at the processing temperature of the molding compositions according to the invention, and that the liquid polyorganosiloxanes do not have too high a volatility and thus are not evaporated off from the molding composition in a considerable amount during processing. Since processing of the molding compositions is carried out at a temperature of up to about 200° to 230° C., the solid polyorganosiloxanes should have a melting point equal to or less than 200° C. and the liquid polyorganosiloxanes should have a volatility—given as weight loss in percentage by weight—of not more than 2.5% by weight (relative to the weight of the quantity of liquid polyorganosiloxane employed for measurement of the volatility).

The solid polyorganosiloxanes have a melting point in the temperature range from, preferably, 60° to 160° C., and in particular from 80° to 140° C.

The liquid polyorganosiloxanes have a volatility, expressed as weight loss, of, preferably, not more than 2.0% by weight, and in particular of not more than 1.5% by weight (relative to the weight of the quantity of liquid polyorganosiloxane employed for the volatility measurement), after being heated at 230° C. under normal pressure for 15 minutes.

Just as the solid polyorganosiloxanes to be used according to the invention are clearly defined by statement of the melting point, the liquid polyorganosiloxanes are already clearly characterized by the given volatility (compare the textbook on "Chemie und Technologie der Silicone" ("Chemistry and Technology of the Silicones") by Walter Noll, Verlag Chemie GmbH, Weinheim, Federal Republic of Germany).

Preferred liquid polyorganosiloxanes to be employed according to the invention are those which, in addition to having the given parameter (a) of volatility, also have the further physical parameters which follow: (b) a refractive index at 25° C. of 1.375 to 1.500, preferably of 1.400 to 1.470, (c) a density at 25° C. of 0.760 to 1.150 g/cm$^3$, preferably of 0.900 to 1.150 g/cm$^3$, and (d) a viscosity at 25° C. of 0.5 to 500,000 mm$^2$/s, preferably of 10 to 50,000 and in particular of 20 to 5,000 mm$^2$/s.

The amount of solid and/or liquid polyorganosiloxanes in the molding compositions according to the invention is preferably 0.1 to 1.0% by weight, relative to the total weight of the molding composition.

Polyorganosiloxanes are compounds of silicon in which the silicon atom is bonded to one, two or three organic groups and the remaining valencies operate via oxygen (compare the textbook on "Chemie und Techologie der Silicone" ("Chemistry and Technology of the Silicones") described in more detail above). There are accordingly three groups which are built up from silicon, oxygen and organic radicals and which are called siloxane units of the polymers. They belong in a series, at the start of which is the grouping formed only from silicon and oxygen and at the end of which is the grouping formed only from silicon and hydrocarbon radicals:

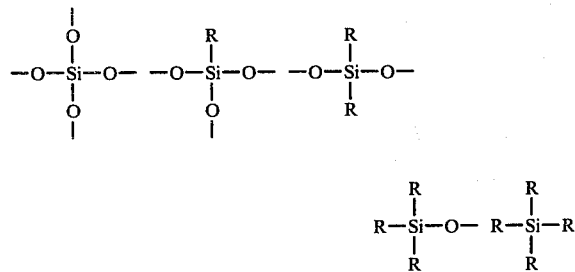

The group [SiO$_4$]$^{4-}$ is the building unit from which the networks of silicon dioxide modifications and of silicates are built up; R$_4$Si has molecular character and is a purely organosilicon compound. The components of the polyorganosiloxanes (silicone polymers) are between these poles.

The composition of a siloxane unit is obtained by taking into consideration the fact that each oxygen atom functions as a bridge between a pair of silicon atoms and accordingly only half an oxygen atom is to be counted as belonging to any silicon atom; the general composition of all members of the abovementioned series is thus $$R_a SiO_{\frac{4-a}{2}}$$

in which, with respect to the actual polyorganosiloxanes, R represents a hydrocarbon radical and a represents a number from 1 to 3.

The solid polyorganosiloxanes to be employed according to the invention consist of siloxane units of the formula I $$R_b^1 SiO_{\frac{4-b}{2}} \qquad \text{I}$$

in which R$^1$ is preferably CH$_3$ and b is preferably 1. The preferred solid polyorganosiloxanes are accordingly built up from CH$_3$SiO$_{3/2}$ units.

The liquid polyorganosiloxanes to be employed according to the invention consist of siloxane units of the formula II $$\left[ \begin{array}{c} (R^2)_x \\ | \\ -Si-O_z \\ | \\ (R^3)_y \end{array} \right]_n \qquad \text{II}$$

in which R$^2$ and R$^3$, which can be identical or different, denote a hydrocarbon radical, n denotes an integer from 5 to 2,000, preferably from 20 to 1,500, z denotes (4−x−y)/2 and the sum of the indices x and y denotes a number from 1 to 2.1.

The substituents R$^2$ and R$^3$ preferably denote an alkyl group with 1 to 18, preferably with 1 to 12, and in particular with 1 to 3, C atoms, the alkyl group can also be substituted, preferably by chlorine; or an alkenyl group with 2 to 18, preferably 2 to 12 and in particular 2 to 4, C atoms; the alkenyl group can also be substituted, preferably by chlorine; or a cycloalkyl group, preferably cyclopentyl or cyclohexyl; or an aryl group, preferably phenyl, which can also be substituted, preferably by chlorine; or an alkaryl group, it being possible for the phenyl radical to be substituted by one or more alkyl groups with in each case preferably 1 to 4 C atoms or by halogen, preferably tolyl, xylyl or ethylphenyl; or an aralkyl group derived from an alkylene radical with preferably 1 to 4 C atoms and an optionally substituted phenyl radical, preferably benzyl or phenethyl; or a cyanoalkyl group; or an aminoalkyl group; or a hydroxyalkyl group. Of the substituents R$^2$ and R$^3$ mentioned, the alkyl groups, aryl groups, aminoalkyl groups and hydroxyalkyl groups are particularly preferred.

The proposed polyorganosiloxanes are in themselves known and are commercially available, for example from Messrs. Wacker-Chemie GmbH, Burghausen, Bayern, Federal Republic of Germany.

The molding compositions, according to the invention, of (A) vinyl chloride polymers and (B) the proposed solid and/or liquid polyorganosiloxanes already have an unexpectedly high degree of white fracture characteristics. These characteristics can be increased further if (C) elastomers are also additionally mixed in. The amount of elastomers is in general 1 to 20% by weight, preferably 2 to 11% by weight, relative to the total weight of the molding composition.

As already mentioned, numerous elastomers which are usually employed for modification of the toughness of vinyl chloride polymers and are present in the vinyl chloride polymer as dispersely distributed particles with a diameter of at least 0.01 μm cause a more or less pronounced white fracture effect. According to the invention, all these elastomers which have a particle size (particle diameter) in the elastic phase of greater than 0.01 μm, preferably 0.1 to 10 μm and in particular 0.1 to 1 μm, can thus in principle be employed.

Elastomers from the group comprising acrylonitrile/butadiene/styrene polymers, methyl methacrylate/butadiene/styrene polymers, methyl methacrylate/acrylonitrile/butadiene/styrene polymers, methyl methacrylate/styrene polymers, styrene/butadiene/styrene (SBS) polymers and methyl methacrylate polymers are preferaby employed.

The ABS, MBS, MABS and SBS polymers each have a butadiene content of preferably at least 35% by weight, relative to the total polymer. The diameter of the elastomer particle in the elastic phase is preferably 0.1 to 10 μm, in particular 0.1 to 1 μm.

ABS polymers which contain 40 to 70% by weight of butadiene, 20 to 40% by weight of styrene and 10 to 25% by weight of acrylonitrile, in each case relative to the total polymer; MBS polymers which contain 35 to 45% by weight of butadiene, 10 to 20% by weight of styrene and 40 to 55% by weight of methyl methacrylate, in each case relative to the total polymer; MABS polymers which contain 40 to 60% by weight of butadiene, 20 to 35% by weight of styrene, 15 to 30% by weight of methyl methacrylate and less than 10% by weight of acrylonitrile, in each case relative to the total polymer; SBS polymers which contain 35 to 70% by weight of butadiene and 30 to 65% by weight of styrene, in each case relative to the total polymer; and methyl methacrylate/styrene polymers which contain 45% by weight of methyl methacrylate and 55% by weight of styrene, in each case relative to the total polymer, have proved particularly suitable. These elastomers are expediently prepared by the known two-stage graft polymerization process in aqueous emulsion.

It was surprising that a white fracture effect can be achieved with solid or liquid polyorganosiloxanes in vinyl chloride polymers. An explanation in physical terms for the unexpectedly high degree of white fracture of the molding compositions according to the invention cannot be given. Those physical conditions mentioned above which can cause white fracture evidently result from admixing polyorganosiloxanes to vinyl chloride polymers. The white fracture effect is particularly pronounced in the case of the molding compositions, according to the invention, of vinyl chloride polymers, polyorganosiloxanes and elastomers. In this case, an unexpectedly high synergistic action must evidently be present between the polyorganosiloxanes and the elastomers which—as mentioned above—already trigger off white fracture by themselves in vinyl chloride polymers.

The type of vinyl chloride polymers to be employed according to the invention is not critical. Homopolymers, copolymers or graft polymers of vinyl chloride are possible. The content of polymerized vinyl chloride in the copolymers and graft polymers is as a rule at least 50% by weight, preferably at least 85% by weight, relative to the polymer.

The following monomers are suitable, for example, for copolymerization with vinyl chloride: olefins, such ethylene or propylene; vinyl esters of straight-chain or branched carboxylic acids with 2 to 20, preferably 2 to 4, carbon atoms, such as vinyl acetate, vinyl propionate, vinyl butyrate or vinyl stearate; vinyl halides, such as vinyl fluoride, vinylidene fluoride or vinylidene chloride; vinyl ethers; unsaturated acids, such as maleic acid, fumaric acid, acrylic acid or methacrylic acid, and monoesters or diesters thereof with monoalcohols or dialcohols with 1 to 10 carbon atoms; acrylonitrile; styrene; and cyclohexylmaleimide. Elastomeric polymers which are obtained by polymerization of one or more of the following monomers can be used, for example, for graft polymerization: dienes, such as butadiene or cyclopentadiene; olefins, such as ethylene or propylene; styrene; unsaturated acids, such as acrylic acid or methacrylic acid and esters thereof with monoalcohols or dialcohols with 1 to 10 carbon atoms; acrylonitrile; and vinyl compounds, such as vinyl esters of carboxylic acids with 2 to 20, preferably with 2 to 4, carbon atoms.

Preferred vinyl chloride polymers are homopolymers of vinyl chloride, copolymers containing at least 85% by weight of polymerized vinyl chloride, or graft copolymers of vinyl chloride containing at least 85% by weight of polymerized vinyl chloride, the copolymer onto which the vinyl chloride is grafted comprising butadiene, isoprene or more highly conjugated dienes and acrylonitrile, styrene, butyl acrylate or methyl methacrylate, preferably butadiene and acrylonitrile in a weight ratio of 90 to 10. The K values (DIN 53 726) of the vinyl chloride homopolymers, copolymers or graft polymers are expediently 50 to 80, preferably 55 to 70.

The mixtures, according to the invention, of (A) vinyl chloride polymers and (B) solid and/or liquid polyorganosiloxanes, or of (A), (B) and (C) elastomers expediently also contain the auxiliaries which are advantageous for the processing of vinyl chloride polymers, preferably heat stabilizers and lubricants. They can also contain other particular additives, for example substances having antistatic action.

Heat stabilizers which are suitable are, for example, monoalkyl- and dialkyl-tin compounds which have 1 to 10 C atoms in the alkyl radical and in which remaining valencies of the tin are bonded to other substituents via oxygen and/or sulfur atoms; aminocrotonates; urea derivatives and thiourea derivatives, for example monophenylurea and diphenylurea; α-phenylindole; salts of alkaline earth metals, zinc, cadmium or lead with aliphatic carboxylic acids, hydroxycarboxylic acids or optionally alkylated, aromatic hydroxy compounds; and basic or neutral lead salts or inorganic acids, for example of sulfuric acid, phosphoric acid or phosphorous acid. The organotin-sulfur stabilizers, for example dimethyl-tin bis-2-ethylhexylthioglycolate, di-n-butyl-tin bis-2-ethylhexylthioglycolate and di-n-octyl-tin bis-2-ethylhexylthioglycolate, are preferably used.

The stabilizers are employed in an amount of 0.5 to 3.0% by weight, preferably 0.8 to 2.0% by weight, relative to the total weight of the molding composition. In addition to the stabilizers, customary costabilizers and/or antioxidants can furthermore also be employed, for example epoxidized soya bean oil; alkyl-substituted hydroxy compounds, such as di-tert.-butyl-para-cresol, dibutylhydroxynaphthalene or tert.-butylhydroxyanisole; and organo-phosphorous acid esters, such as tris-(mono- or di-nonyl)-phenyl phosphites. The effective amount of costabilizers and antioxidants is in general in each case 0.05 to 2.0% by weight, relative to the total weight of the molding composition.

Substances which absorb ultraviolet light, for example benzophenone derivatives or benzotriazole derivatives, such as 2-(2-hydroxy-5-methylphenyl)-benzotriazole or 2-(2'-hydroxy-3'-tert.-butyl-5'-methylphenyl)-5-chloro-benzotriazole, can be added in an amount of 0.05 to 2% by weight, relative to the total weight of the molding composition, in order to improve the stability to light.

Possible lubricants are, for example, the following compounds: higher aliphatic carboxylic acids or hydroxycarboxylic acids, alkali metal or alkaline earth metal salts thereof, esters thereof or amides thereof, for example stearic acid, montanic acid, glycerol monooleate, bis-stearyl- or bis-palmitoyl-ethylenediamine or optionally partially saponified montanic acid esters of ethanediol or 1,3-butanediol; fatty alcohols with more than 10 C atoms and alkyl ethers thereof; low-molecular polyolefins; and hard paraffins. Advantageous lubricants are Wachs OP, that is to say an ester of 1,3-butanediol and montanic acid which has been limed such that about 40% by weight of the montanic acid employed for the liming is present as the calcium salt, Wachs E, that is to say an ester of 1,3-butanediol and montanic acid, and stearic acid and bis-stearylethylenediamine. The proportion of lubricants in the molding compositions is 0.1 to 2.5% by weight, preferably 0.5 to 1.5% by weight, relative to the total weight of the molding compositions.

Additives which have an antistatic action and which can be employed are, for example, the quaternary ammonium salts which are customary in vinyl chloride polymers, these additives being added in an amount of about 0.05 to 1.0% by weight, relative to the total weight of the molding composition.

Preferred molding compositions according to the invention essentially consist of (A) 73 to 98.35% by weight, preferably 83.5 to 96.6% by weight, of at least one vinyl chloride polymer, (B) 0.05 to 1.5% by weight, preferably 0.1 to 1.0% by weight, of at least one solid and/or liquid polyorganosiloxane, (C) 1.0 to 20.0% by weight, preferably 2.0 to 11.0% by weight, of at least one elastomer from the group comprising acrylonitrile/butadiene/styrene polymers, methyl methacrylate/butadiene/styrene polymers, methyl methacrylate/acrylonitrile/butadiene/styrene polymers, methyl methacrylate/styrene polymers and methyl methacrylate polymers, (D) 0.5 to 3.0% by weight, preferably 0.8 to 2.0% by weight, of at least one heat stabilizer for vinyl chloride polymers and (E) 0.1 to 2.5% by weight, preferably 0.5 to 1.5% by weight, of at least one lubricant for vinyl chloride polymers, the percentages by weight in each case being relative to the total weight of the molding composition.

The molding compositions according to the invention are processed to shaped articles by the processing methods known for vinyl chloride polymers. In the case of the production of sheeting, the individual components of the mixture are mixed in a customary mixing device, for example in a high-speed mixer, and are processed to sheeting on an extruder or calander at operating temperatures of 80° to 230° C., preferably 150° to 220° C., the thickness of the sheeting as a rule being 50 to 700 µm, preferably 100 to 400 µm. Calandering of the mixture, which has advantageously been pregelled in a kneader or a roll mill, is preferably carried out on a four-roll or five-roll calander by the high temperature process, the rolls in general being heated to a temperature of 190° to 210° C. The calandered sheeting is taken off from the last calander roll, cooled with the aid of chill rolls and as a rule passed to a winding device.

The molding compositions according to the invention give shaped articles, preferably sheeting, which have outstanding white fracture values when embossed, for example with lettering. They have a high white fracture radius and a high contrast value which occurs in clear contours. The full extent of this white fracture is also retained at the higher temperatures to which the embossed shaped articles may be exposed.

The molding compositions according to the invention have a such pronounced white fracture effect that a embossed pattern of high contrast is even obtained when inorganic or organic colored pigments white pigments and fillers, such as kaolin, silicic acid, chalk, titanium dioxide, azo dyestuff pigments, thioindigo pigments and copper phthalocyanines are incorporated, that is to say even in the case of opaque (colored) sheeting.

Moreover, the shaped articles produced from the molding compositions according to the invention, in particular sheeting, are distinguished by a number of other properties which are desirable or in some cases even required in the case of white fracture sheeting. Thus, they have a relatively high tensile strength and impact strength.

They also largely exhibit the desired values in respect of flexibility (elasticity modulus) on the one hand and rigidity (rigidity modulus) on the other hand. In particular, white fracture sheeting should have a relatively high rigidity even at low thicknesses; however, it should also be relatively flexible so that it can be fitted, for example, onto an uneven background or angular or rounded object without adverse phenomena thereby occurring. On the basis of the unexpectedly high synergistic action of the proposed polyorganosiloxanes according to the invention in respect of white fracture in vinyl chloride polymers, and especially in mixtures of vinyl chloride polymers and elastomers, it is possible to keep the elastomer content relatively low in the molding compositions according to the invention (compared with the molding compositions described in German Patent Specifications Nos. 1,804,049 and 2,547,612). The proportion of liquid components in the molding compositions according to the invention is also relatively low compared with the proportion in the molding compositions described in German Patent Specification No. 2,547,612, which also contain up to 10% by weight of plasticizer in addition to liquid lubricants.

The advantageous values in respect of rigidity and flexibility result from these characteristics of the molding compositions according to the invention. In particular, flexibility is impaired with high proportions of liquid components and rigidity is impaired with high proportions of elastomers. If the proportion of liquid components is high, there is also the danger of cloudiness in the shaped articles, especially when they are exposed to relatively high temperatures. Because of the use of polyorganosiloxanes, the molding compositions according to the invention are thus free from these disadvantages.

The new white fracture sheeting also exhibits particularly good values in respect of absorption of water and transparency. They have a high clarity which is largely retained when they are exposed to relatively high temperatures and a high relative atmospheric humidity. If a matted surface should be desired, this can be obtained, for example, with the aid of two outgoing rolls of the calander which have a structured surface, or in an embossing unit after the calander.

Moreover, the molding compositions according to the invention are also distinguished by being easily processable, preferably by calandering or extruding. For example, they can even be calandered at a relatively high rate without difficulty.

The invention will now be illustrated in still more detail with the aid of comparison examples and examples according to the invention.

The physical properties and data regarding the chemical structure of the polyorganosiloxanes used in the examples are summarized in Table 1.

The components listed in the examples were mixed in a customary high-speed mixer and the mixture was pregelled in a kneader at a temperature of about 140° C. and processed to sheeting of the same thickness—in each case 200 μm—on a four-roll calander, the rolls of which (in the direction in which the sheeting runs) were heated to 190° C., 195° C., 200° C. and 210° C.

1. The contrast value, 2. the white fracture radius, 3. the heat stability, 4. the haze number, 5. the haze number after the sheeting has been kept at 65° C. and 95% relative atmospheric humidity for 8 days, 6. the tensile strength, 7. the impact strength, 8. the elasticity modulus and 9. the rigidity of the sheeting were measured. These properties were measured by the following methods:

1. Contrast value (in figures of merit of 0 to 4):

Strips about 10 to 20 mm wide and about 250 mm long were cut from the sheeting. The individual strips were coated with black lacquer on one side (for example with Flexoschwarz 85 EG 118-1 from Messrs. Gebrüder Schmidt GmbH, Frankfurt-Rödelheim) and, after the lacquer had dried, the strips were provided with letters or numbers both 13 mm high and 4.5 mm high, always in the same manner, using the commercially available embossing unit "Dymo Mite" Tapewriter ®, model 2, from Messrs. Dymo Industries Inc., Berkeley, Calif., USA. The contrast value was determined visually by observing the embossed strips and by comparing the white fracture of the embossings with one another. The strips were rated with the numbers 0, 1, 2, 3 and 4, the figure of merit 0 meaning that the strip (sheeting) exhibits no noticeable white fracture and the figure of merit 4 meaning that it exhibits a very marked white fracture.

2. White fracture radius (in mm):

Strips about 15 mm wide and about 250 mm long were cut from the sheeting. These strips were bent together into a loop and were drawn, by the end of the loop, through a gap with a clear width of 0.650 mm. The gap was formed by two (circular) pieces of wire 17 mm long and 2 mm in diameter, which are fixed, at both ends, parallel to one another. When the loop was pulled through the gap, the radius of the loop was continuously reduced: the radius in millimeters at which the occurrence of white fracture was observed whilst pulling the loop through the gap was measured as the white fracture radius (the radius can be measured with a slide gauge, a feeler gauge or by an optical method).

3. Heat stability (in °C.):

Strips about 12 mm wide and about 100 mm long were cut from the sheeting. Letters 4.5 mm high were embossed, always in the same manner, into these strips with the aid of the abovementioned embossing unit. To determine the heat stability of these embossings, the strips were placed on the electric heating plate of a microscope and the change in the white fracture whilst the temperature was increased progressively by 1° C. per minute, starting at 25° C., was observed. The temperature at which the white coloration of the letters observed through the microscope disappeared completely was noted as the value of the heat stability of the white fracture.

4. Haze number (in %):

The haze number of the sheeting (which was employed for measurement either immediately after being produced or after being stored, for a greater or lesser period, at room temperature and at normal relative atmospheric humidity) was measured in accordance with the ASTM D 1003-61 Standard Test Method for Haze and Luminous Transmittance of Transparent Plastics.

5. Haze number after the sheeting had been kept at 65° C. and 95% relative atmospheric humidity for 8 days (in %):

Samples of sheeting were first freely suspended in a climatically controlled cabinet at 65° C. and 95% relative atmospheric humidity for 8 days. The haze number of these samples of sheeting was measured, as described under point 4, immediately after they were taken out of the climatically controlled cabinet.

6. Tensile strength (in $N/mm^2$):

The tensile strength of the sheeting was measured in accordance with the method of DIN 53 455.

7. Impact strength (in $kJ/m^2$):

The impact strength of the sheeting was measured in accordance with the method of DIN 53 448.

8. Elasticity (in $N/mm^2$):

The elasticity modulus of the sheeting was measured in accordance with the method of DIN 53 457.

9. Rigidity (in N·mm):

The rigidity of the sheeting corresponds to its resistance towards a bending load; this resistance is expressed as the rigidity modulus. The rigidity of the sheeting was measured in accordance with the method of DIN 53 121. The rigidity is proportional to the elasticity modulus multiplied by the third power of the thickness of the sheeting.

Measurements 2 and 6 to 9 were carried out with pieces of sheeting originating both from the longitudinal direction (1) and from the transverse direction (q) of the sheeting (the longitudinal direction is the direction in which the material runs during production of the sheeting and the transverse direction is the direction at right angles thereto).

COMPARISON EXAMPLES

EXAMPLE 1

78.0% by weight of a vinyl chloride (VC) homopolymer which has a K value of 60 and has been prepared by the bulk polymerization process 15.0% by weight of an MBS polymer of 49.0% by weight of methyl methacrylate, 37.0% by weight of butadiene and 14.0% by weight of styrene 1.4% by weight of octyl-tin stabilizer 5.0% by weight of dioctyl phthalate 0.6% by weight of lubricant

EXAMPLE 2

93.0% by weight of the VC polymer according to Example 1
1.4% by weight of octyl-tin stabilizer
5.0% by weight of dioctyl phthalate
0.6% by weight of lubricant

EXAMPLE 3

78.0% by weight of the VC polymer according to Example 1
7.5% by weight of an MBS polymer of 49.0% by weight of methyl methacrylate, 37.0% by weight of butadiene and 14.0% by weight of styrene
7.5% by weight of an ABS polymer of 17.0% by weight of acrylonitrile, 48.0% by weight of butadiene and 35.0% by weight of styrene
1.4% by weight of octyl-tin stabilizer
5.0% by weight of dioctyl phthalate
0.6% by weight of lubricant

EXAMPLE 4

96.0% by weight of the VC polymer according to Example 1
1.0% by weight of polymethyl methacrylate
1.5% by weight of octyl-tin stabilizer
1.5% by weight of lubricant

EXAMPLES ACCORDING TO THE INVENTION

EXAMPLE 5

96.85% by weight of a VC homopolymer which has a K value of 60 and has been prepared by the suspension polymerization process
1.5% by weight of octyl-tin stabilizer
1.5% by weight of lubricant
0.15% by weight of polyorganosiloxane B 1

EXAMPLE 6

95.25% by weight of a VC homopolymer which has a K value of 55 and has been prepared by the suspension polymerization process
2.0% by weight of the MBS polymer according to Example 1
0.5% by weight of polymethyl methacrylate
1.5% by weight of butyl-tin stabilizer
0.6% by weight of lubricant
0.15% by weight of polyorganosiloxane B 1

EXAMPLE 7

94.55% by weight of a VC homopolymer which has a K value of 57 and has been prepared by the bulk polymerization process
2.0% by weight of the ABS polymer according to Example 3
0.5% by weight of a copolymer of 45.0% by weight of methyl methacrylate and 55.0% by weight of styrene
1.5% by weight of butyl-tin stabilizer
1.3% by weight of lubricant
0.15% by weight of polyorganosiloxane B 1

EXAMPLE 8

86.93% by weight of the VC polymer according to Example 7
5.0% by weight of the MBS polymer according to Example 1
5.0% by weight of the ABS polymer according to Example 3
1.5% by weight of octyl-tin stabilizer
1.5% by weight of lubricant
0.07% by weight of polyorganosiloxane B 1

EXAMPLE 9

85.2% by weight of the VC polymer according to Example 7
10.0% by weight of the MBS polymer according to Example 1
0.5% by weight of polymethyl methacrylate
1.5% by weight of octyl-tin stabilizer
1.5% by weight of lubricant
1.3% by weight of polyorganosiloxane B 1

EXAMPLE 10

86.35% by weight of the VC polymer according to Example 5
10.0% by weight of the ABS polymer according to Example 3
0.5% by weight of polymethyl methacrylate
1.5% by weight of methyl-tin stabilizer
1.5% by weight of lubricant
0.15% by weight of polyorganosiloxane B 1

EXAMPLE 11

65.5% by weight of the VC polymer according to Example 1
20.0% by weight of a VC copolymer which contains 10.0% by weight of vinyl acetate and has been prepared by the suspension polymerization process
5.0% by weight of the MBS polymer according to Example 1
5.0% by weight of the ABS polymer according to Example 3
0.5% by weight of polymethyl methacrylate
1.5% by weight of methyl-tin stabilizer
1.5% by weight of lubricant
1.0% by weight of polyorganosiloxane B 2

EXAMPLE 12

86.0% by weight of the VC polymer according to Example 1
5.0% by weight of the MBS polymer according to Example 1
5.0% by weight of the ABS polymer according to Example 3
1.5% by weight of octyl-tin stabilizer
1.5% by weight of lubricant
1.0% by weight of polyorganosiloxane B 3

EXAMPLE 13

86.35% by weight of the VC polymer according to Example 1
5.0% by weight of the MBS polymer according to Example 1
5.0% by weight of the ABS polymer according to Example 3
0.5% by weight of polymethyl methacrylate
1.5% by weight of octyl-tin stabilizer
1.5% by weight of lubricant
0.15% by weight of polyorganosiloxane B 4

EXAMPLE 14

67.75% by weight of the VC polymer according to Example 1

20.0% by weight of a VC emulsion graft polymer containing 7.0% by weight (relative to the VC emulsion polymer) of an elastomeric emulsion copolymer of 90.0% by weight of butadiene and 10.0% by weight of acrylonitrile
5.0% by weight of the MBS polymer according to Example 1
5.0% by weight of the ABS polymer according to Example 3
1.5% by weight of octyl-tin stabilizer
0.6% by weight of lubricant
0.15% by weight of polyorganosiloxane B 5

EXAMPLE 15

85.7% by weight of the VC polymer according to Example 1
5.0% by weight of the MBS polymer according to Example 1
5.0% by weight of the ABS polymer according to Example 3
0.5% by weight of a copolymer of 45.0% by weight of methyl methacrylate and 55.0% by weight of styrene
1.5% by weight of octyl-tin stabilizer
1.5% by weight of lubricant
0.8% by weight of polyorganosiloxane B 6

EXAMPLE 16

86.85% by weight of the VC polymer according to Example 1
5.0% by weight of the MBS polymer according to Example 1
5.0% by weight of the ABS polymer according to Example 3
1.5% by weight of octyl-tin stabilizer
1.5% by weight of lubricant
0.15% by weight of polyorganosiloxane B 7

EXAMPLE 17

86.35% by weight of the VC polymer according to Example 1
5.0% by weight of the MBS polymer according to Example 1
5.0% by weight of the ABS polymer according to Example 3
0.5% by weight of polymethyl methacrylate
1.5% by weight of octyl-tin stabilizer
1.5% by weight of lubricant
0.15% by weight of polyorganosiloxane B 8

The results of the measurements on the sheeting from the examples are summarized in Table II which follows. They demonstrate the advantageous properties, described above, of the molding compositions and shaped articles according to the invention.

TABLE I

| | | Polyorganosiloxane | | | | | | |
|---|---|---|---|---|---|---|---|---|
| | | Chemical description; the meaning of $R^1$, $R^2$ and $R^3$ in formulae I and II | | | Properties | | | |
| Example No. | Abbreviation | $R^1$ | $R^2$ | $R^3$ | Viscosity at 25° C. (mm²/s) | Refractive index at 25° C. | Density at 25° C. (g/cm³) | Volatility weight loss (% by weight) |
| 5 to 10 | B 1 | — | Phenyl or chlorophenyl | Methyl | 500 | 1,470 | 1,150 | <1% at 230° C., 15 minutes |
| 11 | B 2 | — | Methyl or phenyl | Methyl | 20 | 1,440 | 1,010 | |
| 12 | B 3 | — | Methyl | Methyl | 4,850 | 1,403 | 0,970 | <1.5% at 230° C., 15 minutes |
| 13 | B 4 | — | Methyl | Methyl | 490,000 | 1,404 | 0,980 | <0.5% at 230° C., 15 minutes |
| 14 | B 5 | — | Methyl, with a glycol functional group as the end group | Methyl | 2,000 | 1,445 | 1,040 | <1.5% at 230° C., 15 minutes |
| 15 | B 6 | — | Methyl, with an amino functional group as the end group | Methyl | 40 | 1,423 | 1,105 | <1.5% at 230° C., 15 minutes (the amine number is 2.7) |
| 16 | B 7 | — | Methyl, decyl or alkaryl | Methyl | 1,500 | 1,465 | 0,910 | <2% at 230° C., 15 minutes |
| 17 | B 8 | Methyl (b in formula 1 is 1) | — | — | the melting point is in the temperature range from 60 to 80° C. | | | |

TABLE II

| | Values for the properties numbers 1 to 9 of the sheeting according to the examples | | | | | | | | | | | | | |
|---|---|---|---|---|---|---|---|---|---|---|---|---|---|---|
| Example No. | 1 | 2 (mm) | | 3 (°C.) | 4 (%) | 5 (%) | 6 (N/mm²) | | 7 (kJ/m²) | | 8 (N/mm²) | | 9 (N · mm) | |
| | | l | q | | | | l | q | l | q | l | q | l | q |
| 1 | 3 | 1.5 | 1.5 | 77 | 15 | 40 | 46 | 46 | 443 | 523 | 2434 | 2506 | 1.02 | 0.94 |
| 2 | 0 | <1 | <1 | 71 | 6 | 52 | 53 | 58 | 228 | 261 | 3166 | 3010 | 1.34 | 1.36 |
| 3 | 2 | 1.5 | 1.5 | 77 | 23 | 40 | 46 | 44 | 625 | 421 | 2313 | 2222 | 0.90 | 0.89 |
| 4 | 0 | <1 | <1 | 77 | 16 | 44 | 56 | 56 | 603 | 421 | 2868 | 2794 | 1.16 | 1.19 |
| 5 | 3 | 1.5 | 1.5 | 80 | 10 | 35 | 55 | 54 | 623 | 518 | 2892 | 2960 | 1.16 | 1.13 |
| 6 | 3 | 1.5 | 1.75 | 80 | 11 | 32 | 53 | 52 | 565 | 409 | 2901 | 2838 | 1.20 | 1.29 |
| 7 | 3 | 1.5 | 1.75 | 82 | 12 | 32 | 52 | 52 | 406 | 515 | 2917 | 3064 | 1.19 | 1.23 |
| 8 | 4 | 2.0 | 2.5 | 85 | 15 | 31 | 46 | 43 | 543 | 649 | 2640 | 2569 | 1.10 | 1.09 |
| 9 | 4 | 2.5 | 2.5 | 83 | 10 | 30 | 48 | 45 | 679 | 728 | 2636 | 2600 | 1.12 | 1.09 |
| 10 | 4 | 2.5 | 3.0 | 86 | 17 | 30 | 46 | 45 | 740 | 798 | 2565 | 2686 | 1.19 | 1.10 |
| 11 | 4 | 2.5 | 3.0 | 85 | 14 | 29 | 44 | 46 | 689 | 713 | 2636 | 2600 | 1.13 | 1.07 |
| 12 | 4 | 2.0 | 2.75 | 84 | 16 | 31 | 47 | 45 | 818 | 736 | 2704 | 2636 | 1.10 | 1.08 |

TABLE II-continued

Values for the properties numbers 1 to 9 of the sheeting according to the examples

| Example No. | 2 (mm) | | 3 (°C.) | 4 (%) | 5 (%) | 6 (N/mm$^2$) | | 7 (kJ/m$^2$) | | 8 (N/mm$^2$) | | 9 (N·mm) | |
|---|---|---|---|---|---|---|---|---|---|---|---|---|---|
| | l | q | | | | l | q | l | q | l | q | l | q |
| 13 | 4 | 2.5 | 3.0 | 83 | 17 | 31 | 46 | 45 | 899 | 803 | 2829 | 2631 | 1.08 | 1.06 |
| 14 | 4 | 2.75 | 3.0 | 86 | 15 | 30 | 47 | 46 | 738 | 812 | 2791 | 2801 | 1.18 | 1.09 |
| 15 | 4 | 2.5 | 2.75 | 85 | 15 | 30 | 46 | 44 | 693 | 792 | 2829 | 2631 | 1.12 | 1.06 |
| 16 | 4 | 2.5 | 2.75 | 84 | 16 | 30 | 46 | 46 | 784 | 803 | 2600 | 2704 | 1.09 | 1.05 |
| 17 | 4 | 2.75 | 3.0 | 83 | 16 | 32 | 46 | 45 | 615 | 700 | 2734 | 2621 | 1.11 | 1.08 |

We claim:

1. In the process for producing embossments of contrasting white fracture by cold deforming a plastic sheet, the improvement wherein the plastic sheet is formed from a molding composition consisting essentially of (A) 73.0% by weight to 98.35% by weight of at least one vinyl chloride polymer, (B) 0.05% by weight to 1.5% by weight of at least one solid and/or liquid polyorganosiloxane, said solid polyorganosiloxane having a melting point of not greater than 200° C. and said liquid polyorganosiloxane having a volatility, given as weight loss, of not more than 2.5% by weight after being heated at 230° C. under normal pressure for 15 minutes, (C) 1 to 20% by weight of at least one elastomer selected from the group consisting of acrylonitrile/butadiene/styrene polymers, methyl methacrylate/butadiene/styrene polymers, methyl methacrylate/acrylonitrile/butadiene/styrene polymers, methyl methacrylate/butadiene/styrene polymers, methyl methacrylate/styrene polymers and methyl methacrylate polymers, (D) 0.5 to 3.0% by weight of at least one heat stabilizer for vinyl chloride polymers and (E) 0.1 to 2.5% by weight of at least one lubricant for vinyl chloride polymers, the percentages by weight in each case being relative to the total weight of the molding composition.

2. The process of claim 1 wherein the solid polyorganosiloxane has a melting point in the temperature range from 60° to 160° C. and the liquid polyorganosiloxane has a volatility of not more than 2.0% by weight.

3. The process of claim 1 wherein the solid polyorganosiloxane has a melting point of from 80° to 140° C. and the liquid polyorganosiloxane has a volatility of not more than 1.5% by weight.

4. The process of claim 1, 2 or 3 wherein the liquid polyorganosiloxane has a refractive index at 25° C. of 1.375 to 1.500, a density at 25° C. of 0.760 to 1.150 g/cm$^3$ and a viscosity at 25° C. of 0.5 to 500,000 mm$^2$/s.

5. The process of claim 1 wherein the liquid polyorganosiloxane has a viscosity at 25° C. of 10 to 50,000 mm$^2$/s.

6. The process of claim 1 wherein (A) is present in an amount of 83.5 to 96.6% by weight, (B) is present in an amount of 0.1 to 1.0% by weight, (C) is present in an amount of 2.0 to 11.0% by weight, (D) is present in an amount of 0.8 to 2.0% by weight and (E) is present in an amount of 0.5 to 1.5% by weight.

* * * * *